(12) United States Patent
Lambertson

(10) Patent No.: US 7,315,089 B2
(45) Date of Patent: Jan. 1, 2008

(54) POWERTRAIN SYSTEM COMPRISING COMPRESSED AIR ENGINE AND METHOD COMPRISING SAME

(76) Inventor: Michael Carl Lambertson, 31218 Rehobeth Rd., Westover, MD (US) 21871

( * ) Notice: Subject to any disclaimer, the term of this patent is extended or adjusted under 35 U.S.C. 154(b) by 104 days.

(21) Appl. No.: 11/360,777

(22) Filed: Feb. 23, 2006

(65) Prior Publication Data

US 2007/0194573 A1 Aug. 23, 2007

(51) Int. Cl.
*B60K 3/00* (2006.01)
(52) U.S. Cl. .............. 290/1 A; 290/45; 290/4 D; 180/302
(58) Field of Classification Search ........... 290/1 R, 290/1 A, 4 R, 4 D, 40 C, 52; 180/54.1, 302
See application file for complete search history.

(56) References Cited

U.S. PATENT DOCUMENTS

| 774,778 | A | | 11/1904 | Pratt | |
|---|---|---|---|---|---|
| 3,693,351 | A | | 9/1972 | Minkus | |
| 3,765,180 | A | | 10/1973 | Brown | |
| 3,925,984 | A | * | 12/1975 | Holleyman | 60/370 |
| 3,980,152 | A | | 9/1976 | Manor | |
| 4,014,172 | A | | 3/1977 | Jones | |
| 4,018,050 | A | | 4/1977 | Murphy | |
| 4,060,987 | A | * | 12/1977 | Fisch et al. | 60/409 |
| 4,104,955 | A | | 8/1978 | Murphy | |
| 4,124,978 | A | * | 11/1978 | Wagner | 60/410 |
| 4,163,367 | A | * | 8/1979 | Yeh | 60/414 |
| 4,337,842 | A | * | 7/1982 | Spangler et al. | 180/302 |
| 4,355,508 | A | * | 10/1982 | Blenke et al. | 60/416 |
| 4,370,857 | A | * | 2/1983 | Miller | 60/413 |
| 5,296,799 | A | * | 3/1994 | Davis | 322/35 |
| 5,432,383 | A | * | 7/1995 | Kawamura | 290/14 |
| 6,044,924 | A | * | 4/2000 | Adli | 180/302 |
| 6,198,174 | B1 | * | 3/2001 | Nims et al. | 290/52 |
| 6,294,842 | B1 | * | 9/2001 | Skowronski | 290/7 |
| 6,367,247 | B1 | | 4/2002 | Yancey | |
| 6,508,324 | B1 | | 1/2003 | Conley | |
| 6,629,573 | B1 | * | 10/2003 | Perry | 180/54.1 |
| 6,862,973 | B2 | | 8/2005 | Rehkemper et al. | |

* cited by examiner

*Primary Examiner*—Nicholas Ponomarenko
(74) *Attorney, Agent, or Firm*—Raymond M. Galasso; David O. Simmons; Galasso & Associates, LP

(57) ABSTRACT

A powertrain system comprises a compressed air supply apparatus, a compressed air engine, a rotary power conversion apparatus and an electrical power conversion apparatus. The compressed air engine is configured for extracting energy from compressed air. The compressed air engine receives compressed air from the compressed air supply apparatus and produces rotary power through extraction of energy from the compressed air. The rotary power conversion apparatus is connected to the compressed air engine and is configured for converting the rotary power of the compressed air engine to electrical power of a first specification. The electrical power conversion apparatus is connected to the rotary power conversion apparatus and is configured for converting the first specification electrical power to electrical power of a second specification different than the first specification.

8 Claims, 2 Drawing Sheets

POWERTRAIN SYSTEM COMPRISING COMPRESSED AIR ENGINE AND METHOD COMPRISING SAME

FIELD OF THE DISCLOSURE

The disclosures made herein relate generally to powertrain systems comprising a compressed air engine and, more particularly, to powertrain systems having a compressed air engine coupled to an electrical power conversion apparatus that is coupled to a power transmission apparatus.

BACKGROUND

Vehicle powertrain systems that rely entirely on petroleum-based fuel are used throughout the world. They are used in nearly all, if not all, makes, models and types of cars, vans and trucks. From a quantitative perspective, vehicles having these types of vehicle powertrain systems outweigh those with electric and/or hybrid powertrain systems by several magnitudes of order.

It is well known that powertrain systems that rely entirely on petroleum-based fuel are detrimental to the global environment. They are also detrimental to an economy of a country that is highly dependent on imported crude oil as well as its national security. These three adverse considerations make powertrain systems that rely entirely on petroleum-based fuel highly undesirable with respect to the global environment as well as to a country where such powertrain systems are operated.

Therefore, a vehicle powertrain system that does not consume petroleum-based fuel and that produces power from solar energy and regenerative types of power generation techniques would be useful and advantageous.

SUMMARY OF THE DISCLOSURE

In one embodiment of the present invention, a powertrain system comprises a compressed air supply apparatus, a compressed air engine, a rotary power conversion apparatus and an electrical power conversion apparatus. The compressed air engine is configured for extracting energy from compressed air. The compressed air engine receives compressed air from the compressed air supply apparatus and produces rotary power through extraction of energy from the compressed air. The rotary power conversion apparatus is connected to the compressed air engine and is configured for converting the rotary power of the compressed air engine to electrical power of a first specification. The electrical power conversion apparatus is connected to the rotary power conversion apparatus and is configured for converting the first specification electrical power to electrical power of a second specification different than the first specification.

In another embodiment of the present invention, a vehicle comprises a compressed air supply apparatus, a compressed air engine, a rotary power conversion apparatus, an electrical power conversion apparatus, a power distribution apparatus, a power transmission apparatus and an output power control mechanism. The compressed air supply apparatus includes a compressed air storage tank and an air compressor connected to the compressed air tank for supplying compressed air to the compressed air storage tank. The compressed air engine is connected to the compressed air storage tank for receiving compressed air from the compressed air storage tank and is configured for extracting energy from the compressed air. The compressed air engine produces rotary power through extraction of energy from the compressed air.

The rotary power conversion apparatus is connected to the compressed air engine and includes an input-output coupling device and two direct current (DC) electrical power generating devices. The input-output coupling device of the rotary power conversion apparatus is connected between the compressed air engine and each one of the DC electrical power generating devices for enabling transfer of rotary power from the compressed air engine to each one of the DC electrical power generating devices. The electrical power conversion apparatus includes two DC-to-alternating current (AC) inverters, an AC electric motor, an input-output coupling device and an electrical power generating device. Each one of the DC electrical power generating devices of the rotary power conversion apparatus is connected to a respective one of the DC-to-AC inverters for supplying DC electrical power to the respective one of the DC-to-AC inverters such that each one of the DC-to-AC inverters converts the DC electrical power supplied thereto to AC electrical power. A first one of the DC-to-AC inverters is electrically connected to the compressed air supply apparatus and a second one of the DC-to-AC inverters is electrically connected to the AC electric motor. The input-output coupling device of the electrical power conversion apparatus is connected between the AC electric motor and the electrical power generating device of the electrical power conversion apparatus for transferring rotary power from the AC electric motor to the electrical power generating device of the electrical power conversion apparatus. The power distribution apparatus is electrically connected to the electrical power generating device of the electrical power conversion apparatus. The power distribution apparatus receives electrical power from the electrical power generating device of the electrical power conversion apparatus. The power distribution apparatus is configured for selectively outputting electrical power through a plurality of power outlet portions thereof. The power transmission apparatus is connected to a power outlet portion of the power distribution apparatus. The output power control mechanism is connected between the power transmission apparatus and the power outlet portion connected to the power transmission apparatus. The output power control mechanism enables an amount of power outputted by the power transmission apparatus to be selectively varied.

In another embodiment of the present invention, a method comprises a plurality of operations. An operation is performed for extracting energy from compressed air for producing rotary power. An operation is performed for converting the rotary power to electrical power of a first specification. Converting the rotary power includes transferring the rotary power from the compressed air engine to an input portion of a direct current (DC) electrical power generating device such that DC electrical power is supplied at an output portion of the DC electrical power generating device. An operation is performed for converting the first specification electrical power to electrical power of a second specification different than the first specification. Converting the first specification electrical power includes inverting the DC electrical power to alternating current (AC) electrical power, driving an AC motor using the AC electrical power and transferring rotary power of the AC motor to a DC generator such that DC electrical power is supplied at an output portion of the DC generator.

Turning now to specific aspects of the present invention, in at least one embodiment, the rotary power conversion apparatus includes an input-output coupling device and two direct current (DC) electrical power generating devices.

In at least one embodiment of the present invention, the input-output coupling device of the rotary power conversion apparatus is connected between the compressed air engine and each one of the DC electrical power generating devices of the rotary power conversion apparatus for enabling transfer of rotary power from the compressed air engine to each one of the DC electrical power generating devices of the rotary power conversion apparatus.

In at least one embodiment of the present invention, each one of the DC electrical power generation devices of the rotary power conversion apparatus are electrically connected to the electrical power conversion apparatus for providing DC electrical power from the DC electrical power generating apparatuses of the rotary power conversion apparatus to the electrical power conversion apparatus.

In at least one embodiment of the present invention, the electrical power conversion apparatus includes two DC-to-alternating current (AC) inverters, an AC electric motor, an input-output coupling device and an electrical power generating device.

In at least one embodiment of the present invention, each one of the DC electrical power generating devices of the rotary power conversion apparatus is connected to a respective one of the DC-to-AC inverters such that each one of the DC-to-AC inverters converts DC electrical power supplied thereto to AC electrical power.

In at least one embodiment of the present invention, a first one of the DC-to-AC inverters is electrically connected to the compressed air supply apparatus and a second one of the DC-to-AC inverters is electrically connected to the AC electric motor.

In at least one embodiment of the present invention, the input-output coupling device of the electrical power conversion apparatus is connected between the AC electric motor and the electrical power generating device of the electrical power conversion apparatus for transferring rotary power from the AC electric motor to the electrical power generating device of the electrical power conversion apparatus.

In at least one embodiment of the present invention, a power distribution apparatus is electrically connected to the electrical power generating device of the electrical power conversion apparatus.

In at least one embodiment of the present invention, the power distribution apparatus receives electrical power from the electrical power generating device of the electrical power conversion apparatus and the power distribution apparatus is configured for selectively outputting electrical power through a plurality of power outlet portions thereof.

In at least one embodiment of the present invention, an acceleration module is electrically connected to the power distribution apparatus for enabling a stored electrical charge of the acceleration module to be selectively outputted through at least one of the power outlet portions of the power distribution apparatus.

In at least one embodiment of the present invention, a power controller of a battery apparatus is electrically connected to the compressed air supply apparatus for supplying electrical power to the compressed air supply apparatus.

In at least one embodiment of the present invention, electrical power from a battery of the battery apparatus is selectively supplied to the compressed air supply apparatus by the power controller of the battery apparatus when the compressed air engine is inactive.

In at least one embodiment of the present invention, electrical power is selectively supplied from the power distribution apparatus to the power controller of the battery apparatus for enabling the battery to be recharged.

In at least one embodiment of the present invention, a solar panel is electrically connected to the power controller of the battery apparatus for supplying solar-generated electrical power to the power controller of the battery apparatus thereby enabling the solar panel to recharge the battery.

In at least one embodiment of the present invention, a wind-driven electrical power generator is electrically connected to the power distribution apparatus for enabling electrical power generated by the wind-driven electrical power generator to be selectively outputted by the power distribution apparatus.

These and other objects, embodiments, advantages and/or distinctions of the present invention will become readily apparent upon further review of the following specification, associated drawings and appended claims.

DETAILED DESCRIPTION OF THE DRAWING FIGURES

Figure 1:
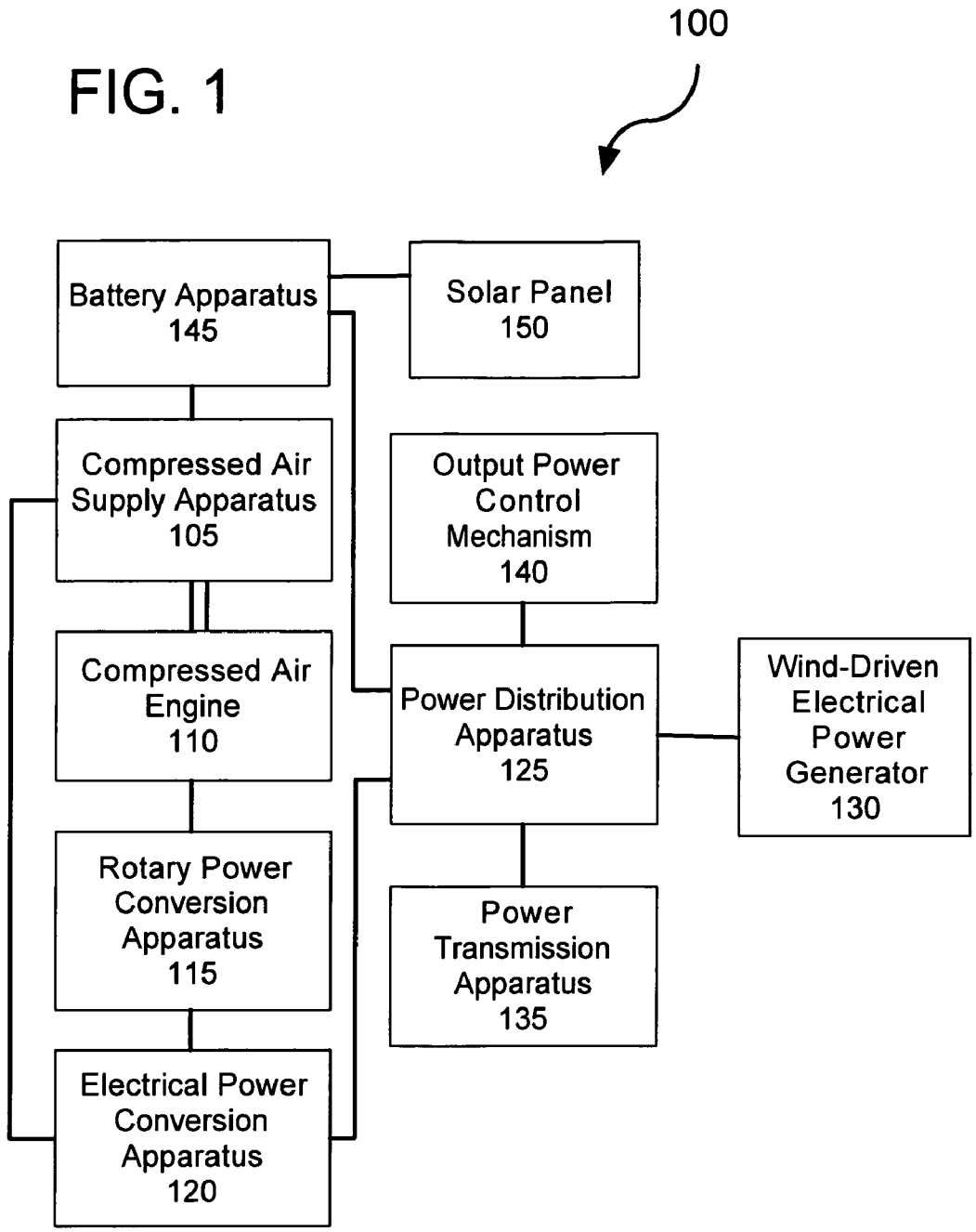
FIG. 1 is a block diagram view showing a powertrain system in accordance with the present invention.

FIG. 1 shows a powertrain system in accordance with the present invention, which is referred to herein as the powertrain system 100. As is discussed below in greater detail, the powertrain system 100 and, generally, powertrain systems in accordance with the present invention includes a plurality of interconnected components that facilitate extraction of energy from compressed air, conversion of that energy to mechanical energy, conversion of that mechanical energy to electrical power. The interconnected components further facilitate selective and variable output of such electrical power, creation of wind-generated electrical power and input of energy from external energy sources. Electrical power is defined herein to include power generated by electrical voltage and/or electrical current.

Referring now specifically to FIG. 1, a compressed air supply apparatus 105 is connected to a compressed air engine 110 in a manner enabling compressed air to be supplied to the compressed air engine 110 from the compressed air supply apparatus 105. The compressed air supply apparatus 105 perform the functions of generating compressed air, storing compressed air and regulating/converting electrical power utilized for generating compressed air. The compressed air engine 110 extracts energy from the compressed air and produces rotary power (i.e., power delivered via an output shaft). Compressed air engines and compressed air supply apparatuses are well-known and the present invention is not unnecessarily limited to a specific configuration of compressed air engine or compressed air supply apparatus. Examples of compressed air engine configurations are disclosed in United States utility U.S. Pat. Nos. 4,104,955; 4,018,050; 4,370,857; 3,980,152; 3,765,180; 3,693,351; 6,862,973; 6,629,573; 6,367,247; 6,508,324; 4,014,172 and 774,778.

A rotary power conversion apparatus 115 is mechanically connected to the compressed air engine 110 in a manner enabling the rotary power produced by the compressed air engine 110 to be transferred to the rotary power conversion apparatus 115. The rotary power conversion apparatus 115 performs the function of converting rotary power produced by the compressed air engine 110 to electrical power of a first electrical specification. An example of electrical power of the first specification is electrical power at a first voltage level, a first electrical current level and a first configuration of electrical current (e.g., alternating current (AC) or direct current (DC)).

It is disclosed herein that any number of means may be implemented for coupling the compressed air engine 110 to the rotary power conversion apparatus 115 and for converting rotary power to electrical power. In one embodiment, a gearbox is coupled between an output shaft of the compressed air engine 110 and an input shaft of an alternator or generator of the rotary power conversion apparatus 115. In another embodiment, a pulley and belt arrangement is coupled between an output shaft of the compressed air engine 110 and an input shaft of an alternator or generator of the rotary power conversion apparatus 115. A skilled person will appreciate that the present invention is not unnecessarily limited to a particular means for coupling the compressed air engine 110 to the rotary power conversion apparatus 115 or to a specific component or set of components for converting (e.g., generating) electrical power from the rotary power.

An electrical power conversion apparatus 120 is electrically connected to the rotary power conversion apparatus 115 in a manner enabling the rotary power produced by the compressed air engine 110 to be transferred to the rotary power conversion apparatus 115. The electrical power conversion apparatus 120 performs the function of converting electrical power of the first specification to electrical power of a second electrical specification different than the first specification. An example of electrical power of the second specification is electrical power having a different voltage level than the first electrical voltage, a current level different than the first electrical current level and/or a configuration of electrical current different than the first configuration of electrical current.

It is disclosed herein that any number of means may be implemented for converting electrical power of the first specification to electrical power of the second specification. In one embodiment, a conversion apparatus such as a DC-to-AC inverter is used for converting DC electrical power supplied by the rotary power conversion apparatus 115 to AC electrical power. In another embodiment, electrical power of the first specification is used to energize a motor that drives a voltage generating device (e.g., a generator) that produces DC electrical power of a second specification. A benefit of generating electrical power of a first specification and then converting it to electrical power of a second specification is that the operating parameters of the compressed air engine (e.g., engine speed, torque, etc.) may lend themselves to producing electrical power of the first electrical specification whereas intended used of electrical power generated by the powertrain system 100 may most efficiently use electrical power of the second specification. A skilled person will appreciate that the present invention is not unnecessarily limited to a particular means for converting (e.g., generating) electrical power of the first specification to electrical power of the second specification.

In at least one embodiment of the present invention, the electrical power conversion apparatus 120 performs the function of converting electrical power of the first specification to electrical power of an intermediate electrical specification different than the first specification and then converts electrical power of the intermediate specification to electrical power of the second electrical specification different than the first specification or second specification. For example, DC electrical power of a first specification is converted to AC electrical power and the AC electrical power is utilized for generating DC electrical power of a second electrical specification. A portion of the AC electrical power may be outputted from the electrical power conversion apparatus 120 without being used for generating DC electrical power of the second specification. Furthermore, it is disclosed herein that conversion of electrical power from a first specification to electrical power a second specification may entail converting DC electrical power of a first specification to DC power of a second electrical specification without any intermediate output of AC electrical power. Similarly, it is disclosed herein that conversion of electrical power from a first specification to electrical power a second specification may entail converting all available DC electrical power to AC electrical power.

The electrical power conversion apparatus 120 is electrically connected to a power distribution apparatus 125 in a manner enabling electrical power of the second electrical specification to be received by the power distribution apparatus 125 from the electrical power conversion apparatus 120. A wind-driven electrical power generator 130 is electrically connected to the power distribution apparatus 125 in a manner enabling electrical power generated by the wind driven electrical power generator 130 to be supplied to the power distribution apparatus 125. A skilled person will appreciate that the present invention is not unnecessarily limited to a particular type of wind-driven electrical power generator. The underlying functionality is that the wind-driven electrical power generator 130 converts wind currents (e.g., free wind currents, motion-induced wind currents, etc) to electrical power and supplies that electrical power to the power distribution apparatus 125 for distribution therefrom.

The power distribution apparatus 125 performs the function of enabling electrical power supplied by the electrical power conversion apparatus 120 and the wind-driven electrical power generator 130 to be selectively distributed to a power transmission apparatus 135. An output power control mechanism 140 is connected to the power distribution apparatus 125 for enabling the power applied to the power transmission apparatus 135 to be selectively varied. In this manner, the power distribution apparatus 125 and the output power control mechanism 140 facilitate output power control jointly. In one embodiment, the output power control mechanism 140 is movable between a plurality of relative orientation and a magnitude of power outputted from the power transmission apparatus 135 is dependent upon such relative orientation. An example of the output power control mechanism 140 includes a rheostat or potentiometer in combination with a manually adjustable device such as a switch or a pedal.

It is disclosed herein that, in other embodiments not specifically shown, the output power control mechanism 140 is electrically connected to the power transmission apparatus 135 as opposed to being electrically connected to the power distribution apparatus 125. In such alternate embodiments, a prescribed amount of power (e.g., 100% available power) is supplied from the power distribution apparatus 125 to the power transmission apparatus 135 and output power control of the power transmission apparatus 135 is facilitated jointly by the power transmission apparatus 135 and the output power control mechanism 140.

The power transmission apparatus 135 is configured in accordance with any number of known power transmission arrangements for converting electrical power to mechanical power. In one embodiment, the power transmission apparatus 135 is an electronic transmission (e.g., of a vehicle). Such a power transmission apparatus receives electrical power and converts the electrical power to mechanical power (e.g., rotary power at a shaft of a motor). By varying the magnitude of the electrical power supplied to the power transmission apparatus 135 and/or by regulating application and/or magnitude of electrical power within the power transmission apparatus 135, the corresponding power outputted from the power transmission apparatus 135 is variable.

The electrical power conversion apparatus 120 is electrically connected to the compressed air supply apparatus 105 in a manner enabling electrical power from the electrical power conversion apparatus 120 to be supplied to the compressed air supply apparatus 105. The electrical power supplied from the electrical power conversion apparatus 120 to the compressed air supply apparatus 105 provides electrical power necessary for enabling the compressed air supply apparatus 105 to generate compressed air that is supplied to the compressed air engine 110. For example, in one embodiment of the present invention, the electrical power conversion apparatus 120 supplies electrical power to an air compressor of the compressed air supply apparatus 105.

A battery apparatus 145 is electrically connected between the compressed air supply apparatus 105 and the power distribution apparatus 125. Electrical power is supplied from the power distribution apparatus 125 to the battery apparatus 145. Electrical power from the battery apparatus 145 is supplied to the compressed air supply apparatus 105. Electrical power supplied from the battery apparatus 145 to the compressed air supply apparatus serves to energize the compressed air supply apparatus 105 in situations where electrical power is not capable of being supplied to the compressed air supply apparatus 105 (e.g., when the compressed air engine 110 is inoperable). In one embodiment, the battery apparatus 145 comprises a plurality of battery cells (e.g., within a single battery or multiple batteries) and a power controller that regulates electrical power supplied to the battery cells and that converts (e.g., from DC to AC) and/or regulates electrical power supplied from the battery cells to the compressed air supply apparatus 105.

A solar panel 150 is electrically connected to the battery apparatus 145. The solar panel 150 converts solar energy to electrical power and that electrical power is provided to the battery apparatus 145 for recharging battery cells of the battery apparatus 145. A skilled person will appreciate that the present invention is not unnecessarily limited to a particular type of solar panel.

Figure 2:
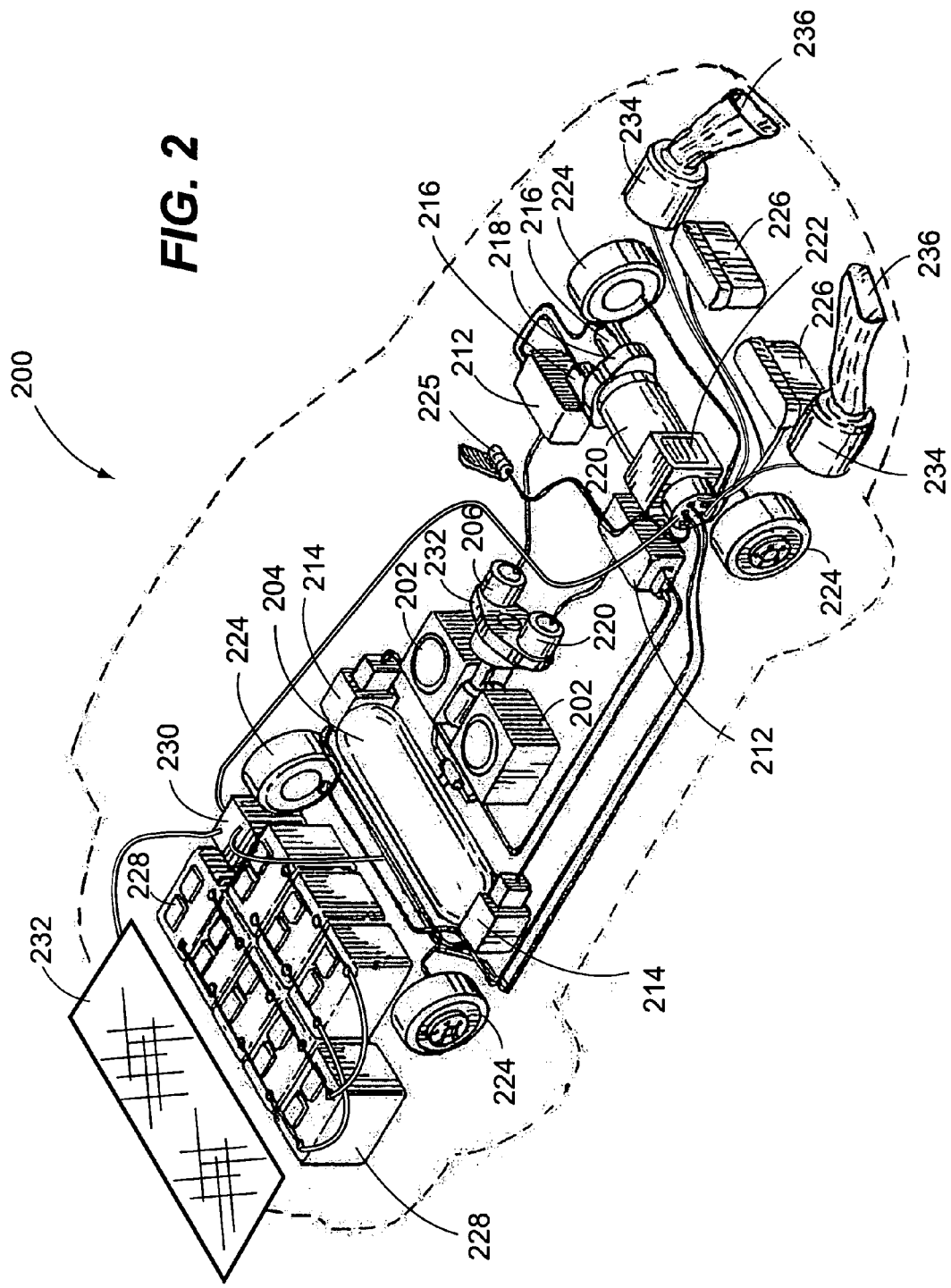
FIG. 2 is a diagrammatic view showing an embodiment of a vehicle comprising a specific implementation of a powertrain system in accordance with the present invention.

FIG. 2 shows an embodiment of a vehicle 200 comprising a specific implementation of a powertrain system in accordance with the present invention. It is disclosed herein that the powertrain system of the vehicle 200 may be integrated into nearly any type of vehicle (e.g., passenger vehicle, commercial vehicle, miliary vehicle, motorcycle, etc). Accordingly, it is disclosed herein that the present invention is not unnecessarily limited in implementation and utilization to any specific type of vehicle.

Two compressed air engines 202 receive compressed air from a compressed air storage tank 204. The compressed air engines 202 each extract energy from the compressed air and output rotary power at a respective output power portion (e.g., a rotating output shaft). The rotating power is transferred to two DC electrical power generating devices 206, thereby providing input power to the two DC electrical power generating devices 206. An alternator and a generator are each examples of DC electrical power generating devices in accordance with the present invention. An input-output coupling device 208 is connected between the compressed air engines 202 and each one of the DC electrical power generating devices 206 for facilitating transfer of rotary power from the compressed air engines 202 to each one of the DC electrical power generating devices 206; A gearbox and a pulley-belt arrangement are two examples of the input-output coupling device 208.

In response to the rotary power being applied to the two DC electrical power generating devices 206, the two DC electrical power generating devices 206 each output DC electrical power. The DC electrical power from a first one of the two DC electrical power generating devices 206 is provided to a first DC-to-AC inverter 210 and the DC electrical power from a second one of the two DC electrical power generating devices 206 is provided to a second DC-to-AC inverter 212. The DC-AC inverts perform the function of transforming DC electrical power to AC electrical power.

The AC electrical power of the first DC-to-AC investors 210 is supplied to two air compressors 214, which jointly supply the compressed air storage tank 204 with compressed air. The AC electrical power of the second DC-to-AC inverter 212 is electrically connected to two AC electric motors 216. The AC electric power from the second DC-AC inverters facilitates electromotive rotation of the AC electric motors 216. An input-output coupling device 218 is mechanically connected between the AC electric motors 216 and a high-output DC electrical power generating device 220 thereby providing for the transfer of rotary power from the AC electric motors 216 to the high-output DC electrical power generating device 220. The high-output DC electrical power generating device 220 is characterized in that it capable of outputting considerably more electrical current at a respective specified voltage than are the DC electrical power generating devices 206 that are mechanically connected to the compressed air engines 206. The DC-to-AC invertors 210, the AC electric motors 216, the input-output coupling device 218 and the high-output DC electrical power generating device 220 are jointly an embodiment of an electrical power conversion apparatus in accordance with the present invention.

A power distribution apparatus 222 is electrically connected to the high-output DC electrical power generating device 220. The power distribution apparatus 222 receives electrical power from the high-output DC electrical power generating device 220. The power distribution apparatus 222 is configured for selectively outputting electrical power through a plurality of power outlet portions (i.e., electrical connections where power output cables are connected).

As depicted in FIG. 2, a plurality of drive motors 224 are provided for turning a front and/or a rear tractive means (e.g., wheels) of the vehicle 200. Each of the drive motors 224 is electrically connected to a respective power outlet portion of the power distribution apparatus 222. An output power control mechanism 225 is connected to the power distribution apparatus 222. The output power control mechanism 225 includes a pedal portion connected to a device such as, for example, a potentiometer or rheostat that enables a relative position of the pedal portion to be correlated to a desired amount of electrical power output (e.g., 30% of maximum power output) applied from the power distribution apparatus 222 to the drive motors 224. In this manner, electrical power may be applied to the drive motors in a variable manner thus facilitating speed control of the vehicle 200. The plurality of drive motors 224 is an embodiment of a power transmission apparatus in accordance with the present invention.

It is disclosed herein that the plurality of drive motors 224 may be replaced with another configuration of power transmission apparatus, such as one with a centralized motor or motors and power transfer means for transferring power to one or more wheels of the vehicle 200.

A plurality of acceleration modules 226 are electrically connected to the power distribution apparatus 222. Each one of the acceleration modules 226 holds a stored electrical charge and is configured for enabling the stored electrical charge to be rapidly discharged. In one embodiment, the acceleration modules 226 each include a capacitive portion (e.g., a large capacitor) that holds a stored electrical charge and enables it to be rapidly discharged. Through its electrical connection to the power distribution apparatus 222, the stored charges of the acceleration modules 226 can be selectively outputted to the power transmission apparatus through a power outlet portion of the power distribution apparatus 222. Discharge of the stored electrical charges serves to boost electrical power applied to the drive motors 224, thereby aiding in acceleration of the vehicle 200. The acceleration modules 226 receive electrical power from the power distribution apparatus 222 for maintaining and replenishing the stored electrical charges.

A plurality of batteries 228 are electrically connected to a power controller 230. The power controller 230 is electrically connected to the air compressors 214 for supplying electrical power from the batteries 228 to the air compressors 214. The electrical power supplied from the batteries 228 is selectively supplied to the air compressors 214 by the power controller 230 when the compressed air engines 202 are inactive and electrical power is selectively supplied from the power distribution apparatus 222 to the power controller 230 for enabling the batteries 228 to be recharged. The power controller 230 converts power as necessary (e.g., converting from DC electrical power to AC electrical power) and regulates control of the electrical power to the air compressors (e.g., supplies electrical power when the compressed air engines 202 are inactive and a pressure level of compressed air within the compressed air storage tank 204 drops below a prescribed level). The batteries 228 and the power controller 230 are jointly an embodiment of a batter apparatus in accordance with the present invention.

A solar panel array 232 is electrically connected to the power controller 230. The solar panel array 232 converts solar energy to electrical power (i.e., solar-generated electrical power). The electrical power generated by the solar panel array 232 is supplied from the solar panel 232 to the power controller 230 for enabling the batteries to be recharged. It is disclosed herein that the solar panel array 232 may be made up of a plurality of discrete solar panels positioned at different locations on the vehicle 200. For example a first solar panel may be attached to a front bumper of the vehicle 200 and a second solar panel may be attached to a rear bumper of the vehicle 200.

A plurality of wind-driven electrical power generators 234 are electrically connected to the power distribution apparatus 222 for enabling electrical power generated by the wind-driven electrical power generators 234 to be supplied to and selectively outputted from the power distribution apparatus. The wind-driven electrical power generators 234 each include a venturi air duct portion 236 expose to a forward facing portion of the vehicle 200. The venturi air duct portion 236 of each one of the wind-driven electrical power generators 234 serves to gather air as the vehicle 200 moves through the air and accelerate the gathered air through a turbine portion of the wind-driven electrical power generators 234 thereby rotating the turbine portion and an attached electrical power generating device. Rotation of the attached electrical power generating device causes generation of the electrical power that is supplied to the power distribution apparatus 222 from a respective one of the wind-driven electrical power generators 234.

A skilled person will appreciate that specifications for components and/or apparatuses of a powertrain system in accordance with the present invention are relative and based on, for example, desired power output of the powertrain system. Thus, detailed specifications for certain components and apparatuses discussed herein are not specifically disclosed. Accordingly, a skilled person will appreciate that specific aspects of such components and apparatuses do not unnecessarily limit the present invention. It is the functionality, interaction and interconnection between such components and/or apparatuses of a powertrain apparatus in accordance with the present invention that provide the underlying basis for the operation and usefulness of the present invention because the detailed specifications for components and apparatuses of a powertrain system in accordance with the present invention are dependent on an intended use of such powertrain system.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A powertrain system, comprising:
   a compressed air supply apparatus;
   a compressed air engine configured for extracting energy from compressed air, wherein the compressed air engine receives said compressed air from the compressed air supply apparatus and wherein said extracting produces rotary power;
   a rotary power conversion apparatus connected to the compressed air engine, wherein the rotary power conversion apparatus is configured for converting said rotary power of the compressed air engine to electrical power of a first specification; and
   an electrical power conversion apparatus connected to the rotary power conversion apparatus, wherein the electrical power conversion apparatus is configured for converting said first specification electrical power to electrical power of a second specification different than the first specification.

2. The powertrain system of claim 1 wherein:
   the rotary power conversion apparatus includes an input-output coupling device and two direct current (DC) electrical power generating devices;

the input-output coupling device of the rotary power conversion apparatus is connected between the compressed air engine and each one of said DC electrical power generating devices for enabling transfer of rotary power from the compressed air engine to each one of said DC electrical power generating devices; and each one of said DC electrical power generation devices are electrically connected to the electrical power conversion apparatus for providing DC electrical power to the electrical power conversion apparatus.

3. The powertrain system of claim 2 wherein:

the electrical power conversion apparatus includes two DC-to-alternating current (AC) inverters, an AC electric motor, an input-output coupling device and an electrical power generating device;

each one of said DC electrical power generating devices of the rotary power conversion apparatus is connected to a respective one of said DC-to-AC inverters such that each one of said DC-to-AC inverters converts DC electrical power supplied thereto to AC electrical power;

a first one of said DC-to-AC inverters is electrically connected to the compressed air supply apparatus;

a second one of said DC-to-AC inverters is electrically connected to the AC electric motor; and the input-output coupling device of the electrical power conversion apparatus is connected between the AC electric motor and the electrical power generating device of the electrical power conversion apparatus for transferring rotary power from the AC electric motor to the electrical power generating device of the electrical power conversion apparatus.

4. The powertrain system of claim 3, further comprising:

a power distribution apparatus electrically connected to the electrical power generating device of the electrical power conversion apparatus, wherein the power distribution apparatus receives electrical power from the electrical power generating device of the electrical power conversion apparatus and wherein the power distribution apparatus is configured for selectively outputting electrical power through a plurality of power outlet portions thereof.

5. The powertrain system of claim 4, further comprising:

an acceleration module electrically connected to the power distribution apparatus for enabling a stored electrical charge of the acceleration module to be selectively outputted through at least one of said power outlet portions of the power distribution apparatus, wherein the acceleration module is configured for receiving an electrical power from the power distribution apparatus for maintaining and replenishing the stored electrical charge.

6. The powertrain system of claim 5, further comprising:

a battery apparatus including a battery and a power controller electrically connected to the battery, wherein the power controller is electrically connected to the compressed air supply apparatus for supplying electrical power thereto, wherein electrical power from the battery is selectively supplied to the compressed air supply apparatus by the power controller of the battery apparatus when the compressed air engine is inactive and wherein electrical power is selectively supplied from the power distribution apparatus to the power controller of the battery apparatus for enabling the battery to be recharged.

7. The powertrain system of claim 6, further comprising:

a solar panel electrically connected to the power controller of the battery apparatus for supplying solar-generated electrical power to the power controller of the battery apparatus thereby enabling the solar panel to recharge the battery.

8. The powertrain system of claim 7, further comprising:

a wind-driven electrical power generator electrically connected to the power distribution apparatus for enabling electrical power generated by the wind-driven electrical power generator to be selectively outputted by the power distribution apparatus.

* * * * *